(12) United States Patent
Tsuchiya

(10) Patent No.: US 7,929,895 B2
(45) Date of Patent: Apr. 19, 2011

(54) IMAGE FORMING APPARATUS

(75) Inventor: Hiroaki Tsuchiya, Nishinomiya (JP)

(73) Assignee: Kyocera Mita Corporation, Osaka (JP)

( * ) Notice: Subject to any disclaimer, the term of this patent is extended or adjusted under 35 U.S.C. 154(b) by 361 days.

(21) Appl. No.: 12/055,774

(22) Filed: Mar. 26, 2008

(65) Prior Publication Data
US 2008/0241461 A1 Oct. 2, 2008

(30) Foreign Application Priority Data
Mar. 29, 2007 (JP) .................................. 2007-089061

(51) Int. Cl.
*G03G 15/16* (2006.01)
(52) U.S. Cl. ......................................... 399/316; 399/273
(58) Field of Classification Search .................... 428/57, 428/58, 79, 172, 174, 480, 483; 399/273, 399/274, 309, 316; 271/18
See application file for complete search history.

(56) References Cited

U.S. PATENT DOCUMENTS

| 4,784,920 A * | 11/1988 | Machida ................... 428/542.8 |
| 4,928,995 A * | 5/1990 | Pickering et al. ............... 281/29 |
| 5,491,022 A * | 2/1996 | Smith ............................ 442/50 |
| 5,594,539 A | 1/1997 | Murano et al. |
| 2004/0169301 A1* | 9/2004 | Chujo et al. .................... 264/41 |
| 2007/0297829 A1* | 12/2007 | Kurosu et al. ................. 399/121 |

FOREIGN PATENT DOCUMENTS

| JP | 8-76607 | 3/1996 |
| JP | 2002338082 | 11/2002 |

* cited by examiner

*Primary Examiner* — Donald Loney
(74) *Attorney, Agent, or Firm* — The Webb Law Firm

(57) ABSTRACT

The object is to provide a resin film capable of retaining a predetermined bent shape, so that the resin film may be employed in a handy and effective manner in the image forming apparatus as such a component as a guide, a cover, etc. The resin film formed product includes a plurality of resin films bonded to each other. Each resin film is bonded with having a bent portion.

4 Claims, 4 Drawing Sheets

IMAGE FORMING APPARATUS

BACKGROUND OF THE INVENTION

1. Field of the Invention

The present invention relates to a resin film formed product and an image forming apparatus having the resin film formed product.

2. Description of Related Art

In an image forming apparatus or the like, there sometimes is employed a resin film for covering a protection-requiring portion such as a sheet conveying guide (see e.g. Japanese Patent Application "Kokai" No. 8-76607).

However, when e.g. it is desired to use the resin film under an oblique posture at a predetermined angle inside the image forming apparatus, the convention would often employ rather indirect or "roundabout" solution such as providing an object to which the resin film is to be fixed with a special shape, providing separately in advance such a member as a sheet metal to which the resin film is to be attached and then mounting this sheet metal under an oblique posture at a predetermined angle inside the image forming apparatus and subsequently fixing the resin film to this sheet metal.

SUMMARY OF THE INVENTION

The present invention has been made in view of the above-described state of the art. The principal object of the present invention is to provide a technique which allows a resin film to obtain a predetermined bent shape and to retain this shape, so that this resin film may be employed in a handy and effective manner in the image forming apparatus as such a component as a guide, a cover, etc.

According to a first characterizing feature of the present invention, a resin film formed product comprises:

a plurality of resin films bonded to each other;

wherein said each resin film is bonded with having a bent portion.

That is to say, according to the resin film formed product of the present invention, the formed product comprises a plurality of resin films which are bonded together in superposition and under a bent posture, so that the formed product is capable of maintaining a predetermined bent posture thereof.

This is because even if each resin film under the bent posture tends to return to its original planar shape due to an internal stress at its bent portion, the bonding of this film with the other resin film(s) at the mutually opposed portions thereof prevents the overlapped faces of the films from being displaced from each other.

According to a second characterizing feature of the present invention, said each resin film includes a fixing portion to be fixed to an attaching object, said fixing portion being extended from said bent portion.

With this construction, as the resin film formed product has the fixing portion extended from the bent portion, and to be fixed to an attaching object, the resin film formed product can be attached without any modification in the shape of the attaching object to which the formed product is to be attached or without separately providing such member as a sheet metal for allowing the attachment of the formed product thereto. In the above, it is possible to cause the formed product to provide a desired function (e.g. the function as a sheet conveying guide, the covering function for a protection-requiring portion, etc.) on the other side of the formed product across the bent portion and away from the fixing portion.

According to a third characterizing feature of the present invention, said plurality of resin films are bonded to each other with double-sided adhesive tape. For realizing this construction, the resin films can be bonded very easily and firmly with using double-sided adhesive tape.

According to a fourth characterizing feature of the present invention, the plurality of resin films include overlapped portions which are overlapped with each other and non-overlapped portions which are not overlapped with each other.

The non-overlapped portions have higher flexibility than the overlapped portions. Therefore, with the resin film formed product having this fourth characterizing feature of the present invention, the formed product can be easily attached to a spot or an object having a rather complicated structure since the non-overlapped portions thereof can readily follow or be deformed according to such structure.

Moreover, when the inventive resin film formed product is employed as a sheet conveying guide, the flexibility of the non-overlapped portions allows formation of a smooth and ideal sheet conveying guide path, hence allowing smoother sheet conveying operation also.

According to a fifth characterizing feature of the present invention, the resin film formed product comprises a pair of resin films of different sizes bonded together under a bent posture.

With the above-described resin film formed product of the invention, as two resin films of differing sizes are bonded together under the bent posture, in this resin film formed product, there are necessarily formed portions which are overlapped with each other (referred to as "overlapped portions" hereinafter) and non-overlapped portions which are not overlapped with each other (referred to as "non-overlapped portions" hereinafter).

According to a sixth characterizing feature of the present invention, said each resin film comprises a polyethylene terephthalate. With this construction, as polyethylene terephthalate is inexpensive and readily available, manufacturing costs of the formed product can be reduced.

According to a seventh characterizing feature of the present invention, there is provided an image forming apparatus wherein the resin film formed product described above is provided so that a portion thereof located opposite to said fixing portion relative to said bent portion functions as a sheet conveying guide.

With the image forming apparatus of the invention, as the resin film formed product described above is provided as a sheet conveying guide, a smooth and ideal sheet conveying guide path can be formed for allowing smoother sheet conveying operation.

DESCRIPTION OF THE PREFERRED EMBODIMENTS

Preferred embodiments of the present invention will be described next with reference to the accompanying drawings.

Figure 1:
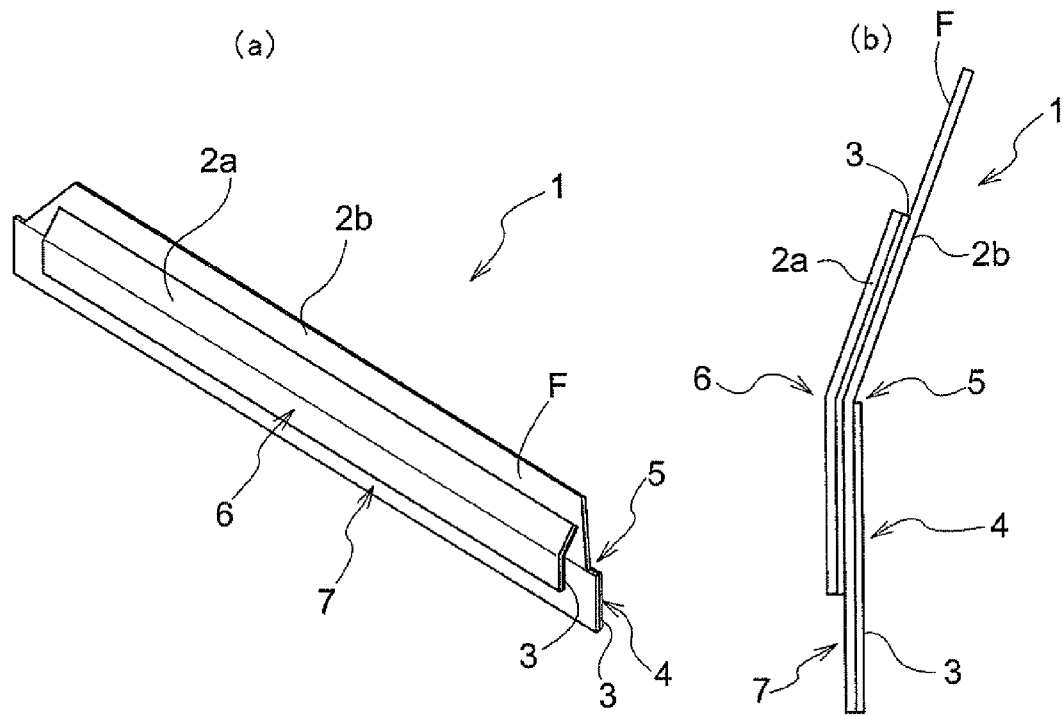
FIG. 1 is a perspective view showing a resin film formed product according to the present invention.
Figure 2:
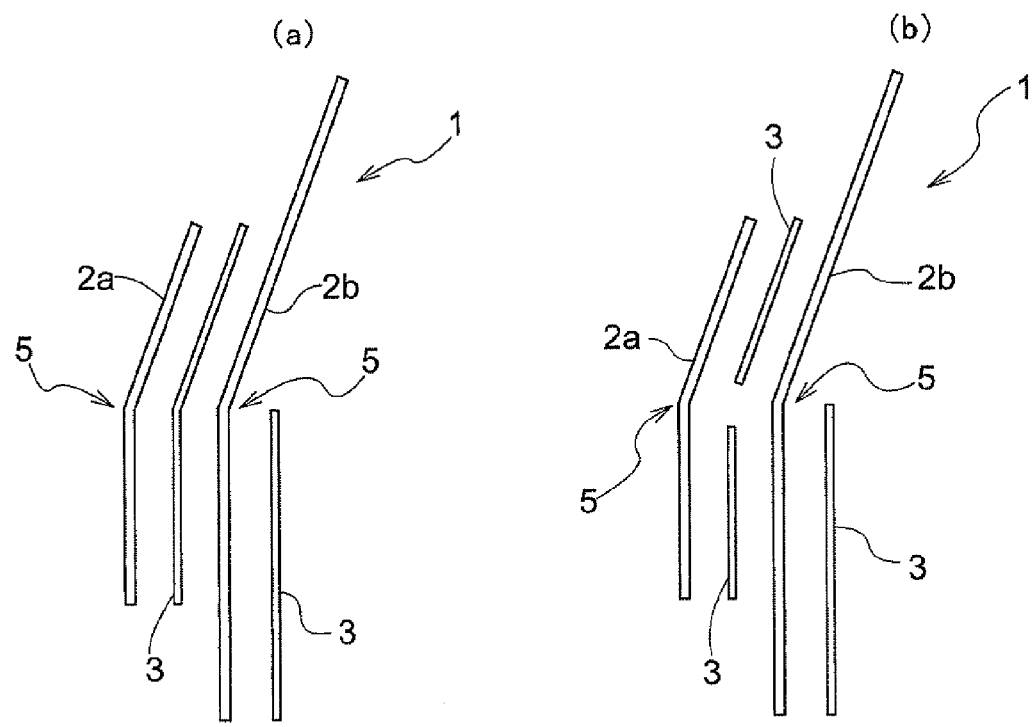
FIG. 2 is an exploded view showing the resin film formed product of the present invention as seen from its lateral side.

FIG. 1 and FIG. 2 show one embodiment of a resin film formed product relating to the present invention. FIG. 1 (b) is a side view of the resin film formed product 1. FIG. 2 is an exploded view of the resin film formed product 1 as seen from its lateral side.

As may be understood from FIG. 1 and FIG. 2, the resin film formed product 1 according to the instant embodiment includes a first resin film 2a, a bonding member 3 and a second resin film 2b. And, this resin film formed product 1 has a bent portion 5 which is bent at a predetermined angle. On one side of the resin film formed product 1 relative to the bent portion 5, there is provided a fixing portion 4 which can be fixed to an attaching object to which the fixing portion 4 is to be fixed. Some non-limiting examples of the attaching object to which the fixing portion 4 is to be fixed are an intermediate transfer belt cleaning device, a sheet conveying guide member, etc. to be provided within the image forming apparatus. The opposite side of the fixing portion 4 relative to or away from the bent portion 5 is configured as a functional portion F for providing a certain desired function (e.g. function as a sheet conveying guide, function as a cover of a protection-requiring portion) within the image forming apparatus.

(Manufacturing Method)

Next, a manufacturing method of the resin film formed product 1 of the instant embodiment will be described with reference mainly to FIG. 2 (a).

First, there are prepared two sheets of resin film 2 of mutually differing sizes (the first resin film 2a and the second resin film 2b) and each resin film 2 is bent at a predetermined angle, thereby forming the bent portion 5.

Incidentally, although the present embodiment employs the bending arrangement, it should be understood that what is referred to as the "bent portion 5" in this invention is not limited to the one formed by bending the resin film 2 at a predetermined angle, but can be formed by curving the resin film 2 into any predetermined shape.

Next, the first resin film 2a and the second resin film 2b which have been bent as described above are overlapped with each other, with keeping the respective bent postures thereof (i.e. the bent portion 5 of the first resin film 2a and the bent portion 5 of the second resin film 2b are overlapped with each other) and then bonded together with an appropriate bonding member 3 (e.g. a double-sided adhesive tape, adhesive agent, curing adhesive, etc.)

Alternatively, as illustrated in FIG. 2 (b), the bonding between the first resin film 2a and the second resin film 2b can be done at a plurality of separate portions thereof.

In the case of the resin film formed product 1 according to the instant embodiment, retention of the predetermined bent posture is realized by the mutual bonding of the two overlapped resin films 2 under their bent postures. This is because even if each resin film 2 tends to return to its original planar shape due to the internal stress at its bent portion 5, the bonding of this film 2 with the other film 2 resists displacement between the overlapped faces thereof, so that the film cannot return to the original planar shape.

Finally, the bonding member 3 is attached to the one side of the second resin film 2b relative to the bent portion 5, thereby to form the fixing portion 4. Here, the "fixing portion 4" refers to a portion included in the resin film formed product 1 which portion is used for fixing of the formed product to an attaching object 8 (see FIGS. 3-5) such as an inside of the apparatus. That is, the fixing portion 4 need not necessarily include the bonding member 3. For instance, in case the attaching object 8 per se has some arrangement which allows engagement/fixation of the resin film formed product 1 thereto, the fixing portion 4 need not include the bonding member 3.

The other side portion of the second resin film 2b relative to the bent portion 5 is configured to constitute the functional portion F for providing a certain function within the image forming apparatus.

Incidentally, as illustrated in FIG. 1 and FIG. 2, in the instant embodiment, there are employed two sheets of resin film 2 of sizes differing from each other (i.e. the first resin film 2a and the second resin film 2b). Therefore, in the resin film formed product 1 according to this embodiment, there are formed portions where the resin films 2 are overlapped with each other (referred to as the "overlapped portions 6") and further portions where the resin films 2 are not overlapped with each other (referred to as the "non-overlapped portions 7"). And, the non-overlapped portions 7 have greater flexibility than the overlapped portions 6. Then, the fixing portion 4 formed of these non-overlapped portions 7 is flexible and can be readily deformed, thus allowing easy attachment of the formed product even to a spot having a rather complicated structure.

As described above, the resin film formed product 1 according to this embodiment has a very simple construction and can be manufactured by a simple method, so that this formed product can be manufactured easily and inexpensively.

(Resin Films)

One example of the resin films 2 usable in the resin film formed product 1 of the invention is polyethylene terephthalate resin film or the like. However, the invention is not limited thereto.

(Bonding Member)

Some examples of the bonding member 3 usable in the resin film formed product 1 of the invention are a commercially available double-sided adhesive tape, adhesive agent, curing adhesive, etc. However, the invention is not limited these.

(Exemplary Uses)

Figure 3:
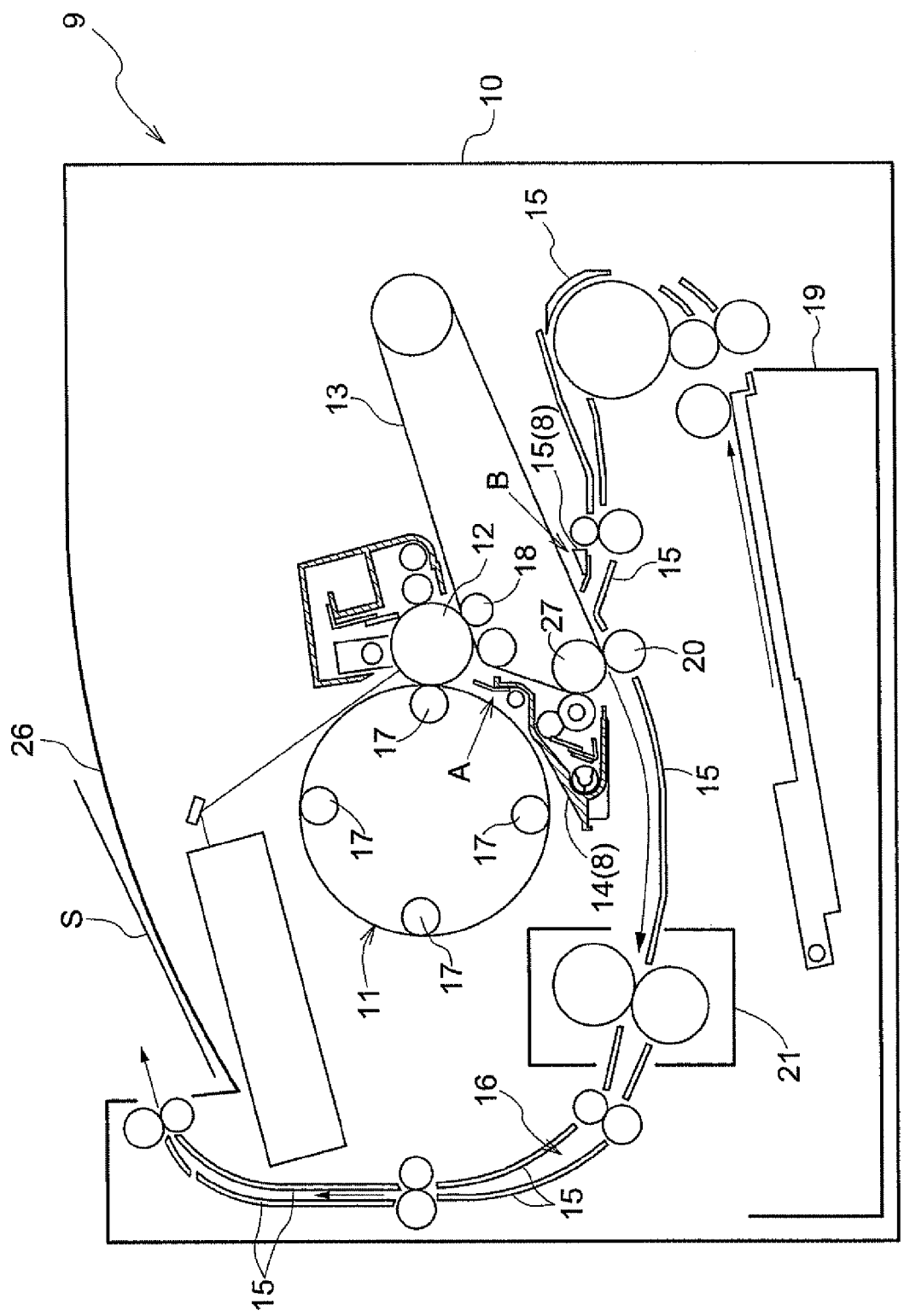
FIG. 3 is a schematic construction view of a color image forming apparatus employing the inventive resin film formed product.

FIG. 3 is a schematic construction view of a color image forming apparatus employing the inventive resin film formed product 1. The inventive resin film formed product 1 can be attached to a variety of attaching objects 8 which are included in the color image forming apparatus 9. Some non-limiting examples of the attaching objects 8 include an intermediate transfer belt cleaning device 14, a guide member 15 forming a sheet conveying path 16, etc. Incidentally, arrows shown within the sheet conveying path in FIG. 3 represent conveying directions of a sheet S.

Next, the basic construction of the color image forming apparatus 9 will be described briefly.

The color image forming apparatus 9 includes, within its body 10, a rotary developing unit 11, a photosensitive drum 12 as an image bearing member, an intermediate transfer belt 13 as an intermediate transfer member, an intermediate transfer belt cleaning device 14 for removing excessive toner remaining on the outer peripheral surface of the intermediate transfer belt 13 and a sheet conveying path 16 formed by a plurality of guide members 15.

Figure 4:
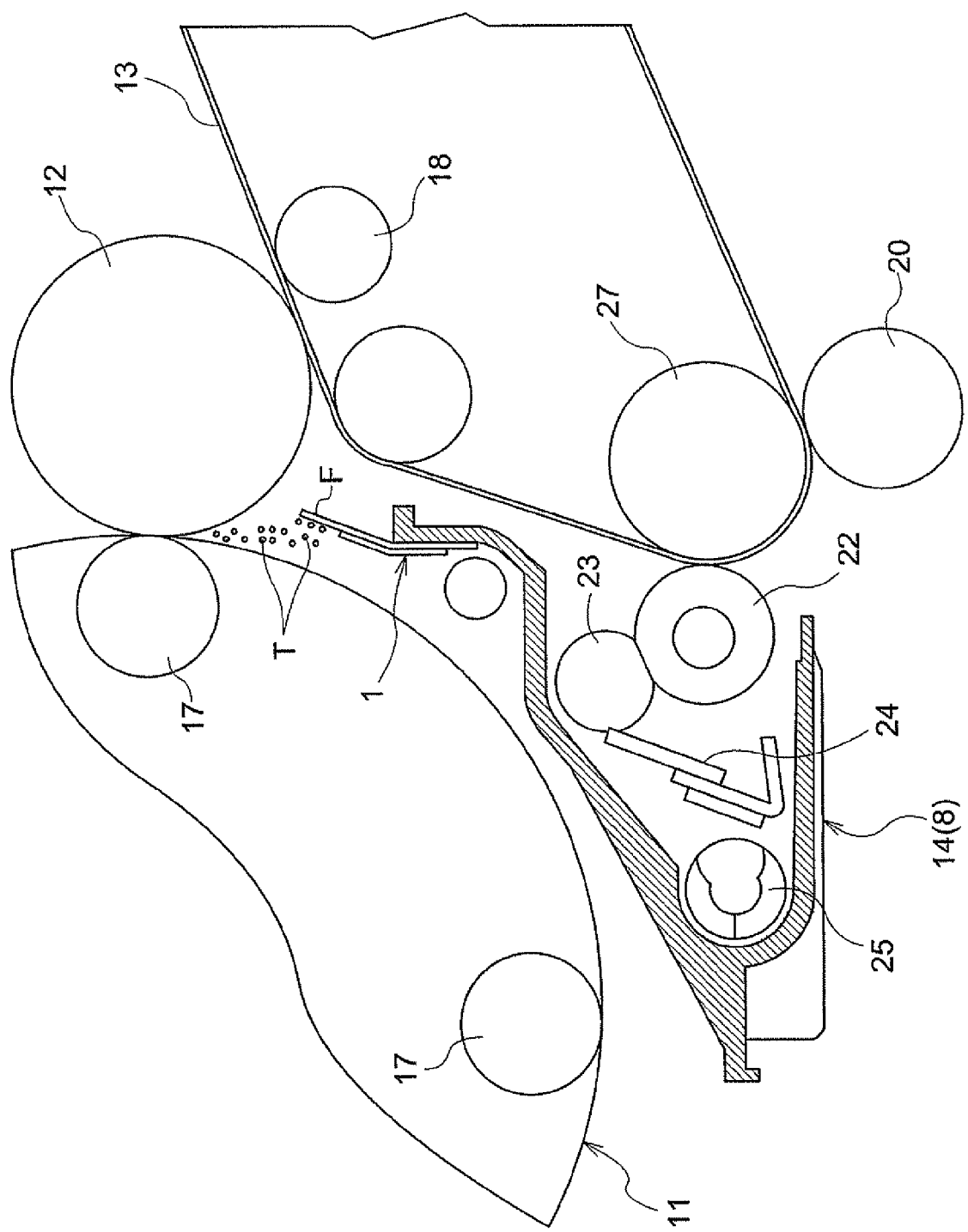
FIG. 4 is an enlarged view of a principal portion A in FIG. 3.
Figure 5:
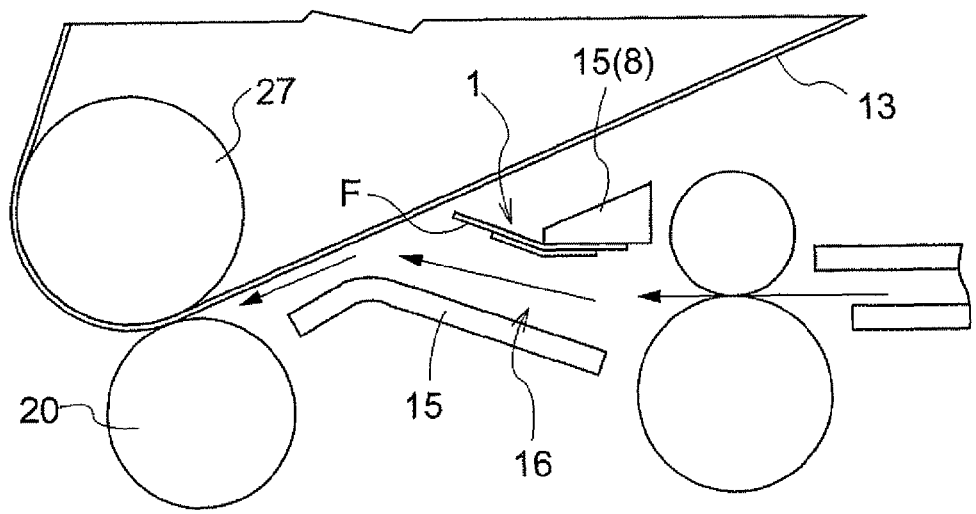
FIG. 5 is an enlarged view of a principal portion B in FIG. 3.
Figure 6:
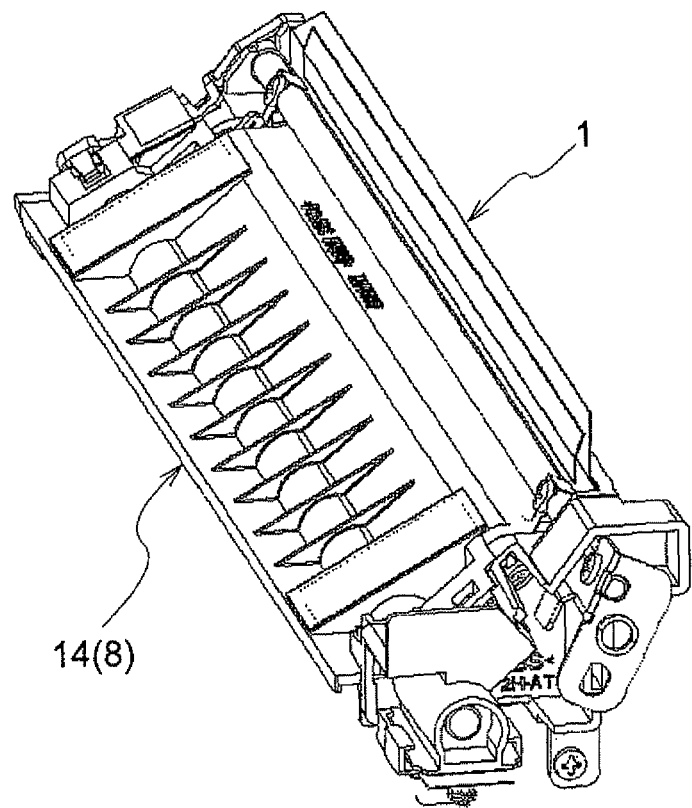
FIG. 6 is a perspective view of an intermediate transfer belt cleaning device.

FIG. 4 and FIG. 5 are enlarged views of a principal portion A and a principal portion B denoted with arrows in FIG. 3, respectively. FIG. 6 is a perspective view of the intermediate transfer belt cleaning device 14 to which the resin film formed product 1 of the invention is attached.

The rotary developing unit 11 includes four developers 17 respectively accommodating therein toners of different colors (yellow (Y), magenta (M), cyan (C) and black (Bk)). Each developer 17 is configured to develop an electrostatic latent image formed on the photosensitive drum 12 with its toner of its own.

More particularly, in association with rotation of the rotary developing unit 11, the developers 17 are brought into opposition to the photosensitive drum 12 one after another, whereby the respective toners thereof are applied to the electrostatic latent image formed on the surface of the photosensitive drum 12, thereby forming a toner image.

Then, in association with an operation of a primary transfer roller 18, this toner image formed on the surface of the photosensitive drum 12 is transferred to the intermediate transfer belt 13.

Thereafter, in association with operations of a secondary transfer roller 20 and a drive roller 27, this toner image transferred to the intermediate transfer belt 13 is transferred to a paper sheet S which is conveyed from a paper conveying cassette 19 through the sheet conveying path 16 by a predetermined timing. Finally, the paper sheet S having the tone image transferred thereto is conveyed to a fixing unit 21 in which the toner image is fixed and then is discharged to a paper discharge tray 26.

As illustrated in FIG. 4, the intermediate transfer belt cleaning device 14 includes a brush roller 22 disposed in such a manner as to contact a portion of the outer peripheral surface of the intermediate transfer belt 13 thereby scraping off excess toner remaining on the outer peripheral surface of this intermediate transfer belt 13, a conductive roller 23 for adsorbing the excess toner scraped off by the brush roller 22, a blade 24 disposed in pressed-contact with the conductive roller 23 for scraping off the toner adsorbed to this conductive roller 23, and a toner conveying screw 25 for collecting the toner scraped off by the blade 24.

FIG. 4 and FIG. 6 illustrate an example where the resin film formed product 1 according to the present invention is attached to the intermediate transfer belt cleaning device 14. In this example, the resin film formed product 1 extends in such a manner as to cross the lower sides of the opposing portions of the developers 17 and the photosensitive drum 12 and also to cover the upper side of a partial area of the intermediate transfer belt 13 (i.e. extending obliquely upward). With this arrangement, the functional portion F of the resin film formed product 1 attached to the guide members 15 of the sheet conveying path 16 receives toner dust T dropping from the opposing portions of the developers 17 and the photosensitive drum 12, thereby preventing the toner dust T from falling onto and getting stuck to the intermediate transfer belt 13 disposed downwards.

Further, FIG. 5 shows an example wherein an ideal and smooth sheet conveying path 16 is formed by the functional portion F of the resin film formed product 1 attached to the guide members 15 of the sheet conveying path 16. The functional portion F provided in the attached resin film formed product 1 provides the sheet conveying path 16 capable of realizing an even smoother sheet conveying operation.

OTHER EMBODIMENTS

1. Size, shape, the number of sheets (the number must be two or more, though) of the resin films constituting the resin film formed product of the invention are not particularly limited. For instance, a plurality of resin films having a same size and a same shape can be employed.

2. The use of the resin film formed product of the invention is not limited to the sheet conveying guide, the cover for a protection-requiring portion described above. The formed product may also be used e.g. as a stirring member for stirring toner.

3. Regarding the attaching object to which the resin film formed product of the invention can be attached, this is not limited to the intermediate transfer belt cleaning device or the guide member for forming a sheet conveying path provided within an image forming apparatus. Instead, the inventive formed product can be attached to any other portion as needed. Further, the object in which the resin film formed product of the invention is usable is not particularly limited to an image forming apparatus.

4. According to the present invention, by bonding and integrating together faces of resin films having desired shapes such as a curved shape, angular shape, planar shape, with the bonding layer, there can be obtained a resin film formed product having sufficiently high ability to retain a desired shape.

What is claimed is:

1. An image forming apparatus for forming an image on a recording medium comprising:
    an attaching object to which a resin film formed product is to be fixed; and
    the resin film formed product fixed to the attaching object,
    wherein the resin film formed product includes a plurality of resin films bonded to each other, at least two of which are different in length,
    wherein each of said resin films includes a bent portion,
    wherein the plurality of resin films are bonded so that the bent portions are overlapped with each other,
    wherein a longer resin film has a first non-overlapped portion extending beyond one side of a shorter resin film relative to the bent portion and a second non-overlapped portion extending beyond the other side of the shorter film relative to the bent portion,
    wherein a whole area of the longer resin film extending on said one side from the bent portion which includes the first non-overlapped portion serves as a fixing portion to be fixed to the attaching object, and
    wherein at least the second non-overlapped portion of the longer resin film serves as a functional portion for guiding a movable object.

2. The image forming apparatus according to claim 1, wherein said plurality of resin films are bonded to each other with double-sided adhesive tape.

3. The image forming apparatus according to claim 1, wherein each of said resin films comprises a polyethylene terephthalate.

4. The image forming apparatus according to claim 1, wherein the second non-overlapped portion functions as a sheet conveying guide.

* * * * *